United States Patent [19]  [11] 4,411,133
Stearns et al.  [45] Oct. 25, 1983

[54] FUEL CIRCUITS FOR FUEL CONTROLS

[75] Inventors: Charles F. Stearns, East Longmeadow, Mass.; Herbert W. Tutherly, Windsor, Conn.

[73] Assignee: United Technologies Corporation, Hartford, Conn.

[21] Appl. No.: 191,544

[22] Filed: Sep. 29, 1980

[51] Int. Cl.³ .............................................. F02C 9/04
[52] U.S. Cl. ................................................ 60/39.281
[58] Field of Search ........................... 60/39.28 R, 243

[56] References Cited
U.S. PATENT DOCUMENTS 3,713,290  1/1973  Gold .............................. 60/39.28 R
4,078,378  3/1978  Gold .............................. 60/39.28 R
4,326,376  4/1982  Stearns et al. ................. 60/39.28 R Primary Examiner—Louis J. Casaregola
Assistant Examiner—Jeffrey A. Simenauer
Attorney, Agent, or Firm—Charles A. Warren

[57] ABSTRACT

The fuel flow for a turboprop or turboshaft engine is provided by a plurality of parallel circuits each of which supplies a portion of the fuel to the engine with different valves controlling the flow through each of the separate circuits. In the turboprop engine there is imposed on the parallel flow circuits a sensing device that determines the pressures in certain of the circuits and selects the appropriate pressure for signalling a pressure regulating valve whereby to vary the pressure drop through the fuel control.

7 Claims, 5 Drawing Figures

4,411,133

FUEL CIRCUITS FOR FUEL CONTROLS

DESCRIPTION

1. Technical Field

This invention relates to flow circuits for hydromechanical fuel control for different turbine engine configurations for example turboshaft and turboprop engines.

2. Background Art

The application of Stearns, U.S. Pat. No. 4,326,376, issued Apr. 27, 1982 describes a flow circuit and a basic engine control for a turbofan engine. The circuits provided are three: (1) a minimum flow circuit; (2) a flow circuit as a function of engine compressor discharge pressure; and (3) a flow circuit that increases in direct relation to the power setting. This circuitry is satisfactory for a turbofan engine but does not meet the requirements of circuitry for other engine configurations such as the turboshaft or turboprop engines.

A related application of Stearns, Ser. No. 191,547, filed Sept. 29, 1980 describes a method of adapting a basic control for turbofan engine to the circuitry needed for either turboprop or turboshaft engines by providing within the control a plurality of recesses to receive adapter plugs in which are included the necessary control elements peculiar to a particular engine configuration. By appropriate arrangement of the flow passages in the basic control so as to intersect the recesses the circuitry may be modified within the basic control to adapt the control to the different configurations. These plugs serve to direct the fuel flow and control pressure flows within the basic control to suit the requirements of a particular configuration.

Another Stearns application, Ser. No. 191,548, filed Sept. 29, 1980 is to some extent a modification of Stearns Ser. No. 191,547, filed Sept. 29, 1980 in that the arrangement of plugs and recesses is replaced by an adapter block attached to the basic control housing and having therein the peculiar flow passages and control devices to provide the necessary flow circuitry for a particular engine. Thus by removal of the turbofan adapter block and substitution of a turboshaft adapter block the circuitry is modified to suit the control to the requirements of the turboshaft engine. Similarly another adapter block for the turboprop engine with suitable flow passages and valves therein would serve to modify the basic control circuitry to suit the requirements of the turboprop engine.

The purpose of both these latter applications is to cover the mechanical structure by which to adapt a basic fuel control for one configuration of a gas turbine engine to the particular requirements of another configuration without a complete revision of the entire control. That is to say the elements of a control common to all configurations of turbine engines will be incorporated in the basic control and inserted therein or attached thereto is the modifying structure by which to adapt the basic control to the requirements of other configurations of gas turbines.

DISCLOSURE OF INVENTION

The present invention is concerned with the flow circuitry in the several configurations of the turbine engine. One feature of the invention is therefore a flow circuitry for turbine engines other than turbofan engines. Another feature is an arrangement of the flow circuitry by which to obtain the necessary fuel flow for different engine configurations such as the turboshaft or turboprop engine configurations. Another feature is flow circuitry for different engine configurations that may be obtained by modifying a basic engine control by the attachment thereto or insertion therein of control elements that route the fuel flow and pressure control flow to accomplish the desired modification of the control to a particular engine configuration.

According to the invention the circuitry is so arranged that the engine flow is metered by the stepper or torque motor, the power lever valve and the servo valve. The windows on the power lever or throttle valve are controlled by power lever angle and the servo windows are set by the sensor as a function of compressor discharge pressure. The flow areas on these components are arranged in three circuits which add to provide total engine flow when the device is utilized for a turboshaft engine. When the flow circuitry is used for the turboprop engine the flow circuitry includes a least selector and a most selector, the latter providing an absolute deceleration limit and the former compared the limit established by the throttle valves and the torque motor flapper valve and utilizes the lower pressure for adjusting the pressure regulating valve.

Other and further objects and advantages of the present invention will become more apparent from the following description of preferred embodiments and accompanying drawings.

BEST MODE FOR CARRYING OUT THE INVENTION

Figure 1:
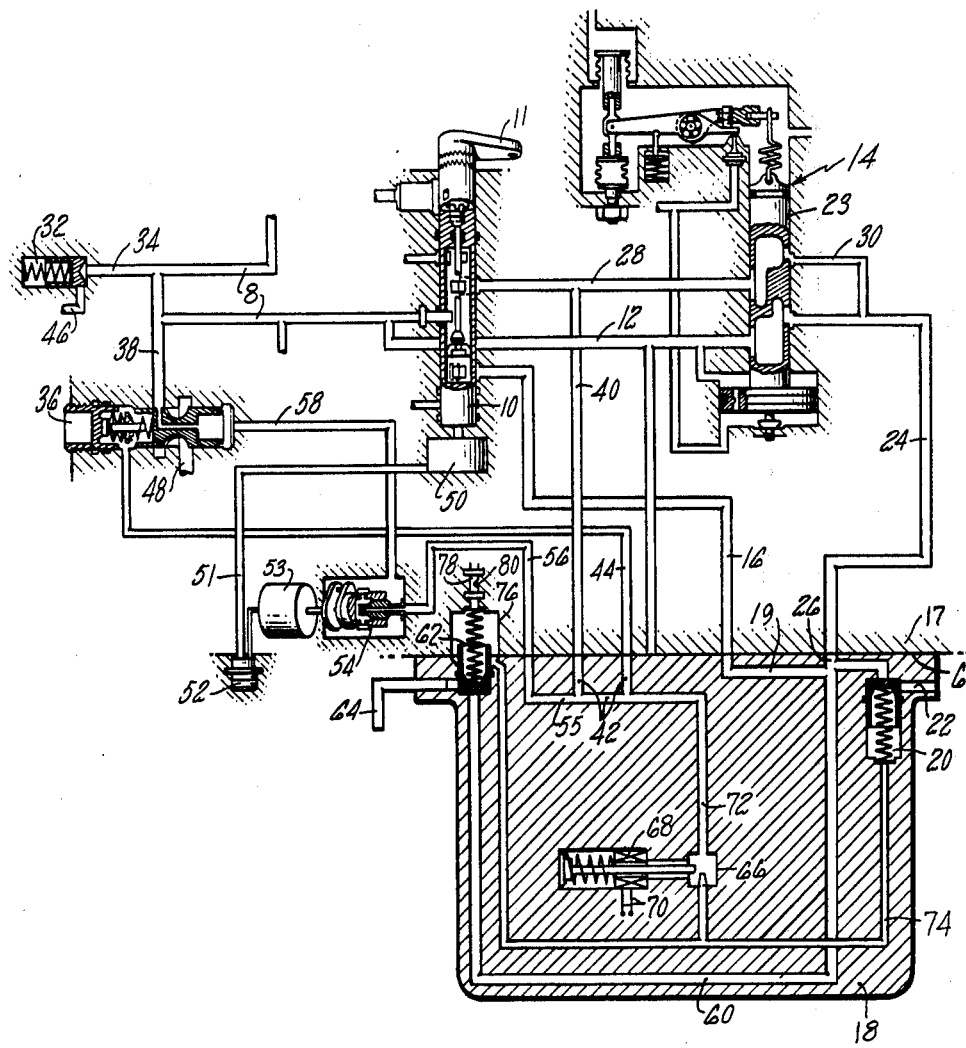
FIG. 1 is a diagrammatic view of a hydromechanical fuel control for a turboshaft engine.

The fuel control shown in FIG. 1 is essentially the control of Stearns, Ser. No. 191,548, filed Sept. 29, 1980. Referring to FIG. 1 fuel is supplied from a pump to a fuel inlet passage 8 leading to the throttle valve 10. This valve is actuated by a power lever (not shown) under the control of the pilot and connected to an arm 11 on the valve. A bypass line 12 from line 8 leads past the throttle valve to the condition responsive valve 23 and is the deceleration line. From throttle valve 10 a minimum flow or starting flow line 16 leads to the interface 17 between the main fuel control and an adapter block 18 mates with the line 19 past a minimum pressure and shut-off valve 20 to an outlet 22 to the engine. From the bypass line 12 fuel is controlled by a condition responsive or servo valve 14 and from this valve goes by line 24 to the interface where it mates with the line 26 in the block connecting with the line 19. Fuel flow in an accelerator line 28 from the throttle valve to the servo valve and thence through this valve in line 30 to the fuel line 24 provides additional fuel flow to the engine.

The inlet line 8 has a high pressure relief valve 32 connected by a branch line 34 and downstream thereof is a pressure regulating valve 36 connected by a branch line 38. A pressure sensing line 40 from line 28 mates at the interface with the line 42 in the block having both its ends at the interface and thence through line 44 in the housing to the pressure regulating valve 36. Both the valve 32 and pressure regulating valve 36 have outlets 46 and 48 respectively.

The position of the throttle valve is signalled to the electronic control unit by a potentiometer 50 on the end of the valve and leads 51 to the electronic control connector 52. The electronic control drives a stepper motor 53 that stops in whatever position failure of the electronic control unit occurs and operates through a valve 54 to deliver a fluid pressure signal from the passage 42 by way of branch passage 55 in the block and mating passage 56 leading to the valve 54 and thence through line 58 to the end of the pressure regulating valve.

The block 18 also has a fuel line 60 therein from the connection of lines 19 and 26 to a minimum pressure and shut-off valve 62 and thence through main outlet passage 64 to the engine. Thus, in this configuration, the starting and minimum flow line 22 is a separate connection to the engine other than the main flow line 64. This may be for example, a particular customer's requirement and is not necessarily an essential part of the basic control.

The two shut-off valves 20 and 62 are actuated by a valve 66 moved by an overspeed solenoid 68 under the control of the electronic control unit through leads 70 or by the throttle valve providing that it dumps the low pressure side of the regulator to pump inlet pressure. The valve 66 is in a line 72 on the block that intersects line 42 so that control fluid from these valves is available from the acceleration line.

Figure 2:
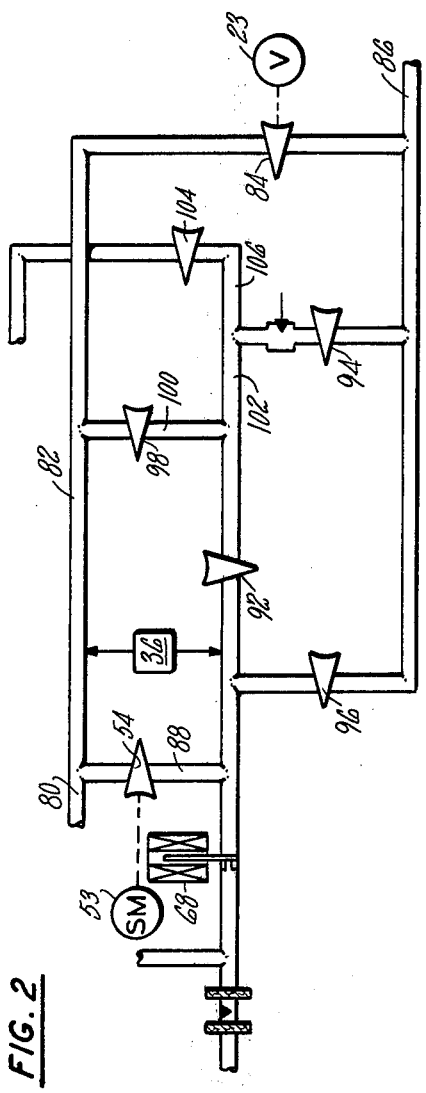
FIG. 2 is the flow circuitry provided by the control of FIG. 1.
Figure 3:
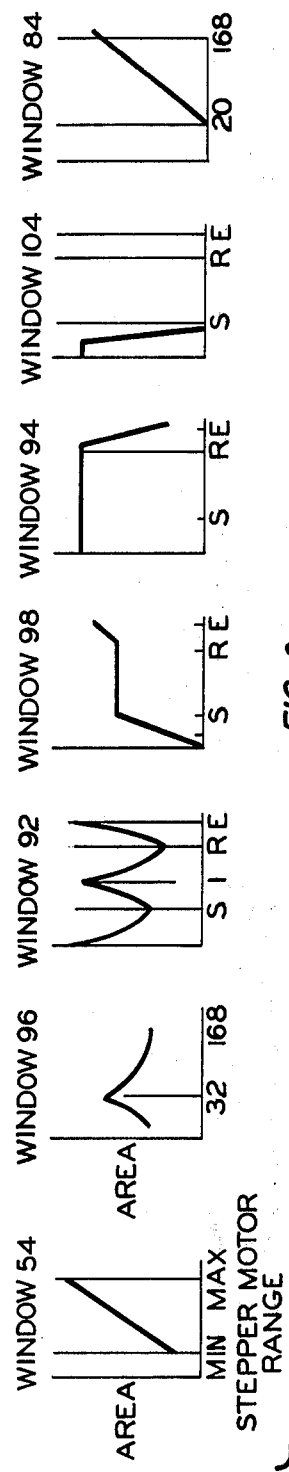
FIG. 3 is a chart of the window openings.

The circuitry for this control is shown in FIG. 2 and the functioning of the several valves or windows is shown in the series of diagrams of FIG. 3. The engine flow is metered by the stepper motor, power lever valve or throttle valve and the servo valve. The power lever angle sets the area of the valve windows in the throttle valve and the flow area in the servo valve is set by compressor discharge pressure. The flow areas are arranged in three circuits which add together to provide total fuel flow to the engine.

Fuel entering at the inlet 80 (FIG. 2), corresponding to line 8, FIG. 1, is divided between line 82 through servo valve window 84 to the outlet 86, corresponding to lines 22 and 64, FIG. 1, to the engine and line 88 through the stepper motor valve or window 54. The pressure regulating valve 36 maintains a constant pressure drop across this valve 54. Downstream of the stepper motor valve the flow splits between two parallel paths; one is through windows 92 and 94 in the throttle valve and thence to the outlet 86. The other is through window 96 in the servo valve to the outlet 86. Window 94 is open for all power lever positions up to 80° of the power lever angle and the windows 92 and 96 determine the pressure drop across the entire circuit. For example at fixed openings for valve windows 92 and 96 an increase in stepper motor window flow increases the flow through both these windows and thereby the pressure drop across these windows and consequently across window 84.

There is another window 98 in the throttle valve and this is located in the line 100 from line 82 to line 102 between valve windows 92 and 94. This window 98 is a constant area between 15° and 80° of the power lever angle position and thus adds to the total flow of the engine. This window 98 is in series with window 94. Window 98 is in parallel with windows 54 and 92.

There are thus three fuel flow circuits to the engine that together supply the total flow to the engine. The first circuit is through the stepper motor valve window 54, across which the pressure regulating valve maintains a constant pressure, and downstream of the stepper valve to either servo window 96 or through throttle valve windows 92 and 94 in series to the engine.

The second circuit is through throttle valve windows 98 and 94 in series. Since window 98 is a constant valve between 15° and 80° of power lever angle and window 94 is also constant, a flow for this portion of the power lever angle is constant in this circuit. The third circuit is through servo window 84.

The circuitry is of particular utility if the stepper motor fails by reason of failure of the electronic control unit. If the stepper motor fails at maximum flow opening the power lever will serve as a functional control and will operate between 30° and 80° of power lever angle. If the stepper motor fails at minimum flow opening the lever will operate between 80° and 95° for power lever angle.

Windows 98, 92 and 94 are so arranged as to produce the schedules of FIG. 3. The control may obtain large ratio units at starting and after reaching idle at 30° the schedule is reduced to prevent overfuelling in the event of the stepper motor failing at maximum flow. After reaching idle at 30° the pilot lever is arranged so that it cannot accidentally be pulled back below this point by proper linkages or stops on the lever.

The charts shown in FIG. 3 indicate the function of each of several windows of the valves shown in the diagram. For purpose of better understanding it will be noted that the corner of each separate chart is represented as shutdown, S represents start, I represents idle, R is normal running condition and E is extended operation. It is believed that with these diagrams the particular functioning of the several valves or windows would be readily apparent. There is also a dump throttle valve window 104 in a line 106 from line 102. This connects to the pump inlet and permits shutdown of the engine by the position of the pilot lever.

Figure 4:
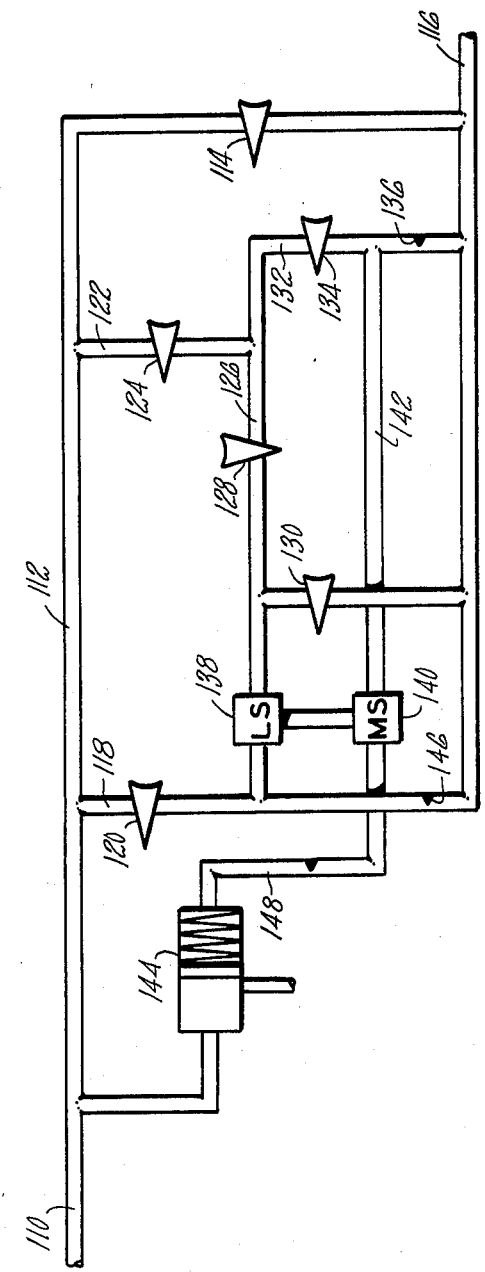
FIG. 4 is a comparable circuitry utilized for a turboprop engine.
Figure 5:
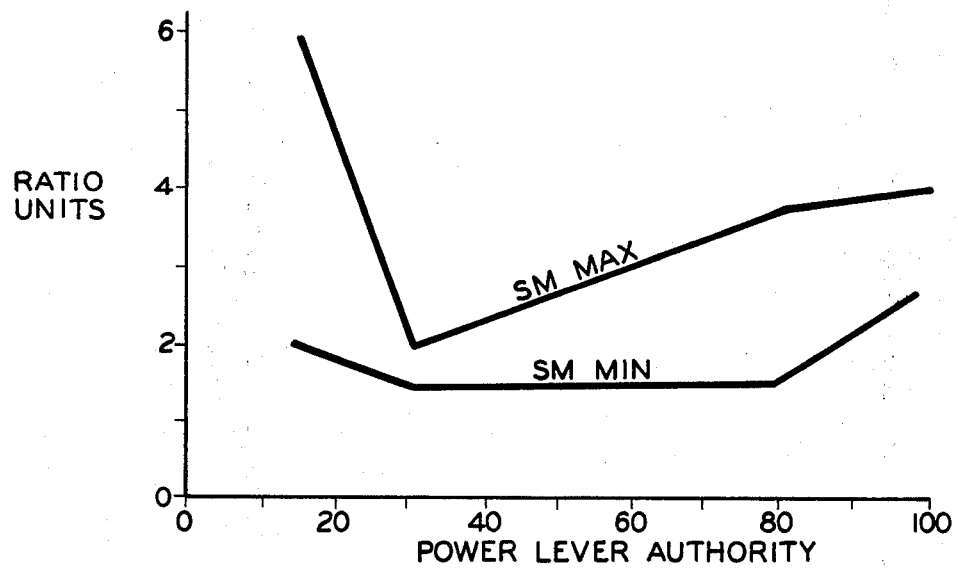
FIG. 5 is a diagram of the power lever authority for the circuitry of FIG. 4.

Referring now to FIG. 4, a diagram comparable with that of FIG. 2 is shown for a turboprop engine. In this circuitry the fuel enters at 110 and divides between line 112 to servo valve window 114 to the outlet 116 to the engine, and line 118 to torque motor valve window 120 and fixed orifice 146 to the engine outlet 116. Line 122 from line 112 goes through throttle valve window 124 and divides between line 126 to throttle valve window 128 and servo valve window 130 to the outlet and line 132 through throttle valve window 134 and a fixed orifice 136 to the outlet.

Superimposed on this circuitry is the least selector 138 that receives pressure signals from line 118 below window 120 and line 126 between windows 128 and 130, and a most selector 140 that receives a signal through line 142 from line 132 downstream from window 134. This most selector 140 transmits a signal through line 148 to the pressure regulating valve 144 that is positioned to control the pressure in line 110.

It will be understood that a change in pressure drop across valve window 114 will control the flow rate therethrough. Changes in computing circuits parallel to line 112 may be used to control this pressure. These computing circuits are: (1) the torque motor window 120 with a fixed orifice 146 in series in line 118; (2) line 126 with windows 128 and 130; and (3) line 132 with the throttle valve window 134 and a fixed orifice 136. The second and third circuits establish operating limits and the first circuit schedules fuel flow within these limits.

The least and most selectors transmit the appropriate pressure to the pressure regulating valve for maintaining the total pressure drop across window 114.

The torque motor schedules pressure drop according to fuel requirements established by the electronic control that actuates it and the circuit including windows 128 and 130 sets the upper fuel limit by establishing a maximum allowable pressure drop across this circuit. The least selector compares these pressure drop demands and the lower pressure is used for the pressure regulating valve setting, this pressure being transmitted through the most selector.

Throttle valve window 134 in conjunction with the fixed orifice establishes the lower limit for total pressure drop and provides to the most selector an absolute deceleration limit which signals may be sent to the pressure regulating valve. That is to say, if the pressure signal in line 142 is higher than the signal from the least selector, this signal is transmitted to the regulating valve 144.

The three fuel circuits for fuel to the engine are: (1) the line 112 with a servo valve window 114; (2) the line 118 through torque motor valve window 120; and (3) line 122 through throttle valve window 124 and branching to either line 126 through throttle valve window 128 and servo valve window 130, or the parallel line 132 including throttle valve window 134 and a fixed orifice.

It is believed that the foregoing establishes an adequate understanding of the fuel circuitry provided for these two types of engines and its functioning. Further basic disclosure of the particular fuel control itself is found in detail in the above-identified Stearns application, Ser. No. 69,141 and such further description of the basic control as may be desirable for an understanding of the function of the basic control is incorporated by reference in the present application.

Although this invention has been shown and described with respect to a preferred embodiment, it will be understood by those skilled in the art that various changes in form and detail thereof may be made without departing from the spirit and scope of the claimed invention.

We claim:

1. A hydromechanical fuel control for controlling fuel flow to a gas turbine engine including:
   three parallel flow circuits between an inlet and an outlet to the engine;
   a first circuit including a motor valve responsive to engine power requirements dividing into one branch with a first throttle valve window and another branch with a servo valve window;
   a second circuit including a second throttle valve window in parallel with the servo valve window of said first circuit; and
   a third circuit including valve means providing fuel flow as a function of a compressor discharge pressure.

2. A fuel control as in claim 1 in which the motor valve of the first circuit is actuated by a motor sensitive to engine requirements.

3. A fuel control as in claim 1 in which an electrical control operates in conjunction with the hydromechanical control and the motor valve of the first circuit is responsive to said electronic control.

4. A fuel control as in claim 1 in which a pressure control valve is in parallel with the motor valve.

5. A hydromechanical fuel control for controlling the fuel flow to a gas turbine engine of a turboprop or turboshaft configuration including:
   three parallel flow circuits between a fuel inlet port and an outlet port to the engine;
   a first circuit including a motor valve and branch lines from said valve to the outlet, one branch line having a servo window and the other branch line having two throttle valve windows in series, one of said two windows being open at all normal operating speeds;
   a second circuit including a throttle valve window in series with said one of said two windows in the first circuit; and
   a third circuit including a servo valve window responsive to an engine parameter.

6. A hydromechanical fuel control as in claim 5 in which the motor is a torque motor sensitive to torque requirements of the engine.

7. A fuel control as in claim 5 including a pressure relief valve to maintain a selected pressure across the motor valve.

* * * * *